US006781119B2

(12) United States Patent
Smith et al.

(10) Patent No.: US 6,781,119 B2
(45) Date of Patent: Aug. 24, 2004

(54) ION STORAGE SYSTEM

(75) Inventors: Donald K. Smith, Belmont, MA (US); Stephen F. Horne, Chelmsford, MA (US); Matthew M. Besen, Andover, MA (US)

(73) Assignee: MKS Instruments, Inc., Wilmington, MA (US)

( * ) Notice: Subject to any disclaimer, the term of this patent is extended or adjusted under 35 U.S.C. 154(b) by 72 days.

(21) Appl. No.: 10/017,766

(22) Filed: Dec. 14, 2001

(65) Prior Publication Data

US 2002/0162957 A1 Nov. 7, 2002

Related U.S. Application Data

(60) Provisional application No. 60/255,556, filed on Dec. 14, 2000.

(51) Int. Cl.[7] .......................... B01D 54/44; H01J 49/00
(52) U.S. Cl. ...................... 250/286; 250/283; 250/292
(58) Field of Search ............................... 250/292, 288, 250/281, 286, 283

(56) References Cited

U.S. PATENT DOCUMENTS

| | | | |
|---|---|---|---|
| 2,939,952 A | | 6/1960 | Paul et al. |
| 5,610,397 A | * | 3/1997 | Kelley ........................ 250/282 |
| 5,650,617 A | * | 7/1997 | Mordehai ................... 250/290 |
| 5,714,755 A | * | 2/1998 | Wells et al. ................ 250/281 |
| 5,859,433 A | * | 1/1999 | Franzen ...................... 250/292 |
| RE36,906 E | * | 10/2000 | Franzen et al. ............. 250/292 |
| 6,140,641 A | * | 10/2000 | Yoshinari et al. ........... 250/292 |
| 6,545,268 B1 | * | 4/2003 | Verentchikov et al. ...... 250/287 |

OTHER PUBLICATIONS

Konig, M., et al., Quadrupole Excitation Of Stored Ion Motion At The True Cyclotron Frequency, International Journal Of Mass Spectrometry And Ion Processes, 1995, pp. 95–116, vol. 142, Elsevier Scientific Publishing Co, Amsterdam, NL.
Dawson, P. H., et al., Ion Storage In Three–Dimensional, Rotationally Symmetric, Quadrupole Fields. I. Theoretical Treatment, The Journal Of Vacuum Science And Technology, Jul. 5, 1967, pp. 1–10, vol. 5, No. 1.
Dawson, P.H., et al., Ion Storage In Three–Dimensional, Rotationally Symmetric, Quadrupole Fields. II. A Sensitive Mass Spectrometer, The Journal of Vacuum Science and Technology, Jul. 5, 1967, pp. 11–18, vol. 5, No. 1.
Glish, G.L., et al, Ion Process, Practical Aspects of Ion Trap Mass Spectrometry, pp. 6–7, vol. 1.

* cited by examiner

*Primary Examiner*—Jack Berman
*Assistant Examiner*—Kalimah Fernandez
(74) *Attorney, Agent, or Firm*—Kurt Rauschenbach; Rauschenbach Patent Law Group, LLC

(57) ABSTRACT

An ion storage system is described that includes an ion trap that defines a volume for storing a plurality of ions. A radio frequency (RF) generator is electromagnetically coupled to the volume defined by the ion trap. The RF generator generates an RF electrical field that stores the plurality of ions in the ion trap. A switching device terminates the RF electrical field, which ejects the plurality of ions from the ion trap. An ion detector detects at least a portion of the plurality of ions that are ejected from the ion trap.

46 Claims, 4 Drawing Sheets

ION STORAGE SYSTEM

RELATED APPLICATIONS

This patent application claims priority to provisional patent application Ser. No. 60/255,556, filed on Dec. 14, 2000, the entire disclosure of which is incorporated herein by reference.

FIELD OF THE INVENTION

The invention relates generally to ion beam devices and instruments. In particular, the invention relates to methods and apparatus for storing and ejecting ions.

BACKGROUND OF THE INVENTION

Quadrupole ion traps are ion storage devices that are commonly used in mass spectrometers. Quadrupole ion traps have electrodes that are shaped to produce a three-dimensional quadrupolar field that stores ions. Many known quadrupole ion traps have hyperbolic shaped electrodes, which gives rise to a three-dimensional quadrupolar field. Generally, quadrupole ion traps are designed and operated to store only ions having a charge-to-mass ratio within a certain range.

Quadrupole ion traps can be configured and operated to simultaneously eject all of the stored ions. Quadrupole ion traps can also be configured and operated to periodically eject ions according to their charge-to-mass ratio as a function of time to produce a mass spectrum of ions. For example, periodic ejection of ions according to their charge-to-mass ratio can be accomplished by varying the voltages applied to the ion trap as a function of time to eject ions having differing charge-to-mass ratios. The ions are ejected out of the storage field and into an ion detector. The ion detector counts the ejected ions or measures the ion flux of the resulting ion beam. Known ion traps generally produce mass spectrums of ions that are heavier than Argon.

SUMMARY OF THE INVENTION

An ion storage system is described that can be used in a mass spectrometer or in a leak detector. In one embodiment, an ion storage system according to the present invention is used in a mass spectrometer-based leak detector. An ion storage system according to the present invention ejects ions by abruptly terminating the RF field trapping the ions. Abruptly terminating the RF field causes substantially all of the ions to be ejected in a relatively short period of time, which generates a relatively high ion current signal. In one embodiment, the ion current of ions ejected from the ion storage system is measured at a time that is synchronized to electrical events associated with the ion storage systems, such as the termination of the RF field, injection of the sample gas, and interrupting the operation of electrical noise producing devices such as vacuum pumps.

Accordingly, the present invention features an ion storage system that includes an ion trap that defines a volume for storing a plurality of ions. In one embodiment, the ion trap forms a substantially cylindrically shaped volume. In another embodiment, the ion trap forms a volume having substantially curved walls. The curved walls can be substantially hyperbolic in shape.

The ion storage system further includes a radio frequency (RF) generator that is electromagnetically coupled to the volume defined by the ion trap. The RF generator generates a RF electrical field that stores the plurality of ions in the ion trap. The ion storage system also includes a switching device that terminates the RF electrical field. The termination of the RF electrical field causes the plurality of ions to be ejected from the ion trap.

In one embodiment, the switching device is an electronic switching device. In another embodiment, the switching device is a mechanical or electro-mechanical switching device, such as a relay. In one embodiment, the switching device causes a short circuit condition that terminates the RF electrical field. The switching device can terminate the RF electrical field within a time period that is substantially less than or equal to one cycle of the RF electrical field. In one embodiment, the switching device is substantially synchronized with a predetermined phase of the RF electrical field. In one embodiment, a clock synchronizes the switching device. In one embodiment, the clock synchronizes the switching device to the ion detector. Alternatively, the clock can determine a time at which the switching device terminates the RF electrical field.

In one embodiment, the ion storage system includes an ion source that generates the plurality of ions. In one embodiment, the ion source provides the plurality of ions to the ion trap. In another embodiment, the ion source generates the plurality of ions in the volume defined by the ion trap. In one embodiment, the ion source includes an electron source. For example, the electron source can include a thermionic emission filament. In one embodiment, the ion source includes a gas injector, which may be a pulsed gas injector, which provides neutral gas molecules or atoms to the ion source.

The ion storage system also includes an ion detector. In one embodiment, the ion detector includes an electron multiplier. In one embodiment, the ion detector is substantially synchronized to the switching device. The ion detector is adapted to detect at least a portion of the plurality of ions that are ejected from the ion trap. In one aspect of the invention, the ion detector is substantially synchronized to the generation of the ions by the ion source. In another aspect, the ion detector is substantially synchronized with a predetermined phase of the RF electrical field. In yet another aspect of the invention, the ion detector is substantially synchronized to the interruption of sources of electrical noise, such as the filament power supply and the vacuum pump motor power supply.

The present invention also features an ion storage system that includes an ion source that generates a plurality of ions, an ion trap that defines a volume for storing the plurality of ions, a radio frequency (RF) generator that is electromagnetically coupled to the volume defined by the ion trap, an ion detector that detects at least a portion of the plurality of ions that are ejected from the ion trap, and a clock that synchronizes events occurring within the ion storage system. In one embodiment, the ion source generates the plurality of ions in the ion trap. In one embodiment, the ion source includes an electron source and a pulsed gas source.

In one embodiment, the ion trap forms a substantially cylindrically shaped volume. In another embodiment, the ion trap forms a volume having substantially curved walls. The curved walls can be substantially hyperbolic in shape. The RF generator is adapted to generate a RF electrical field that stores the plurality of ions in the ion trap. The ion storage system also includes a switching device that terminates the RF electrical field, thereby ejecting the plurality of ions from the ion trap. The ion detector detects at least a portion of the plurality of ions that are ejected from the ion trap.

The clock is electrically connected to at least two of the ion source, the RF generator, the switching device, and the ion detector. The clock is adapted to substantially synchronize at least two of the ion source, the RF generator, the switching device, and the ion detector. In one embodiment, the detector includes an electron multiplier. In another embodiment, the ion detector is substantially synchronized to the interruption of sources of electrical noise, such as the filament power supply and the vacuum pump motor power supply.

The present invention also features a method for detecting ions. In one embodiment, the method includes generating ions from neutral gas molecules or atoms. The method also includes establishing a radio frequency (RF) electrical field proximate to a plurality of ions, thereby trapping the plurality of ions in a volume.

In one embodiment, the RF electrical field is terminated, thereby ejecting the plurality of ions from the volume. At least a portion of the plurality of ions ejected from the volume is detected at a predetermined time after terminating the RF electrical field. In one embodiment, a time at which the RF electrical field is terminated is substantially synchronized to at least one of a predetermined phase of the RF electrical field and a time of detecting at least a portion of the ions ejected from the volume.

In one embodiment, the termination of the RF electrical field is completed substantially within one cycle of the RF electrical field. In another embodiment, the detection of the portion of the plurality of ions ejected from the volume occurs at a predetermined time after the termination of the RF electrical field. In another embodiment, the detection of the portion of the ions ejected from the ion trap occurs at a predetermined time after the termination of the RF electrical field that maximizes a signal-to-noise ratio of an electrical signal related to the detection of the portion of the ions. In yet another embodiment, the termination of the RF electrical field comprises establishing a short-circuit condition that terminates the RF electrical field.

The present invention also features a leak detector. The leak detector includes an ion source that receives a tracer gas and that generates a plurality of ions of the tracer gas. An ion trap defines a volume for storing the plurality of ions of tracer gas. A radio frequency (RF) generator is electromagnetically coupled to the volume defined by the ion trap. The RF generator generates a RF electrical field that stores the plurality of ions of the tracer gas in the ion trap.

The leak detector includes a switching device that terminates the RF electrical field. The termination of the RF electrical field ejects the plurality of ions from the ion trap. An ion detector detects at least a portion of the plurality of ions that are ejected from the ion trap. A clock is electrically connected to at least two of the ion source, RF generator, the switching device, and the ion detector. The clock substantially synchronizes at least two of the ion source, the RF generator, the switching device, and the ion detector.

BRIEF DESCRIPTION OF THE DRAWINGS

The above and further advantages of this invention can be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
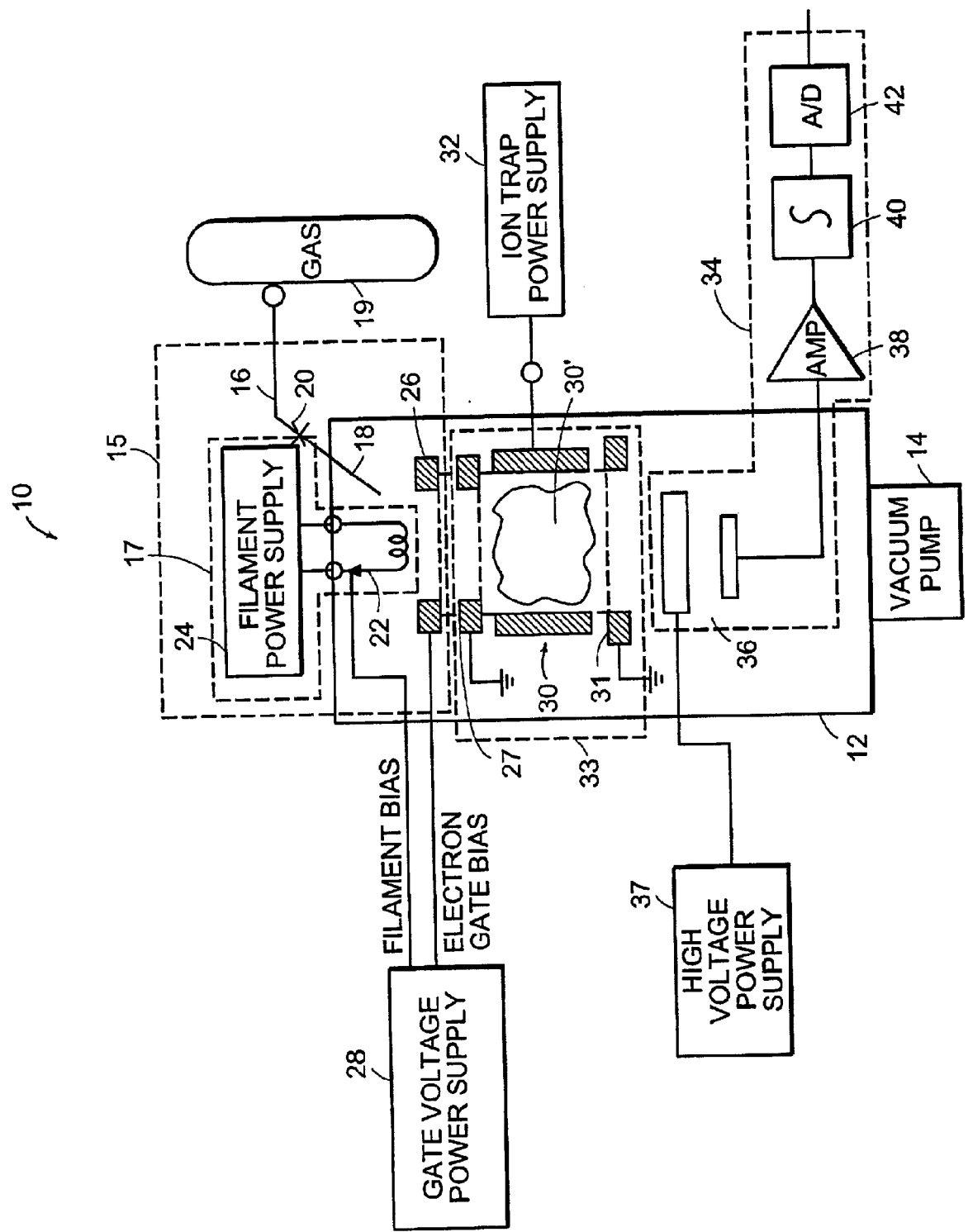
FIG. 1 illustrates a schematic diagram of one embodiment of the ion storage system of the present invention.

FIG. 1 illustrates a schematic diagram of one embodiment of the ion storage system 10 of the present invention. The ion storage system 10 includes a vacuum chamber 12 that maintains some of the system components under vacuum. A vacuum pump 14 evacuates the vacuum chamber 12 to a low pressure. In one embodiment, the vacuum pump 14 includes a turbomolecular pump and a forepump. The vacuum pump 14 can be a miniature turbomolecular vacuum pump or other miniature vacuum pump that is used to reduce the size of the instrument.

The ion storage system 10 also includes an ion source 15. Any type of ion source can be used with the ion storage system 10 according to the present invention. In one embodiment, the ion source 15 includes a gas induction system 16 and an electron source 17. The gas induction system 16 introduces a gas to be ionized into the ion source 15. The electron source 17 generates electrons that ionize the gas.

In the embodiment shown, the gas induction system 16 includes a pulsed gas injector 18 that injects gas from a gas source 19 into the ion source 15 in a relatively short period of time. In one embodiment, the gas induction system 16 uses a fast operating valve 20 that injects the gas in a short period of time.

In the embodiment shown, the electron source 17 includes a thermionic emission filament 22 that is positioned in the vacuum chamber 12. Numerous other types of electron sources can be used with the ion storage system 10. A filament power supply 24 is electrically coupled to the filament 22. The filament power supply 24 is typically positioned external to the vacuum chamber 12. The filament power supply 24 generates a sufficiently high current that is passed though the filament 22 to cause thermionic emission of electrons from the filament 22. In operation, the electrons that are thermionically emitted from the filament 22 collide with neutral gas molecules or atoms, thereby ionizing the neutral gas molecules or atoms.

A gate electrode 26 is positioned adjacent to the filament 22 in the path of the emitted electrons. A gate voltage power supply 28 is electrically coupled to the gate electrode 26. The gate voltage power supply 28 is a switched DC power supply that is typically positioned external to the vacuum chamber 12. The gate voltage power supply 28 generates a DC voltage that when applied to the gate electrode 26 creates a potential difference between the thermionic filament 22 and the gate electrode 26. The potential difference produces an electric field between the thermionic filament 22 and the gate electrode 26. The electric field attracts electrons through the electron gate 26 during the ionization period and retards electrons so as to prevent them from passing through the electron gate 26 during times outside of the ionization period. By ionization period we mean the period of time in which a substantial number of ions are created.

The ion storage system 10 also includes an ion trap 33. In one embodiment, the ion trap 33 includes a first ground electrode 27, an ion trap cylinder 30, and a second ground electrode 31. The first ground electrode 27 is positioned proximate to the gate electrode 26. The ion trap cylinder 30 is positioned adjacent to the first ground electrode 27 in the path of the electrons emitted from the filament 22. The ion trap cylinder 30 includes a volume 30' that selectively stores ions having a particular charge-to-mass ratio.

In one embodiment, the ion trap cylinder 30 is substantially cylindrical in shape. In other embodiments, the ion trap cylinder 30 has curved walls, such as hyperbolic shaped walls or any other shaped walls that can sufficiently generate an electric field that traps ions having a particular charge-to-mass ratio. For example, in one embodiment, the ion trap is a Paul ion trap as described in U.S. Pat. No. 2,939,952, the entire disclosure of which is incorporated herein by reference. The second ground electrode 31 can be positioned proximate to the ion trap cylinder 30. The second ground electrode 31 forms the one end of the ion trap 33.

An ion trap power supply 32 is electrically coupled to the ion trap cylinder 30. Typically, the ion trap power supply 32 is positioned external to the vacuum chamber 12. In one embodiment, the ion trap power supply 32 includes a DC and a RF power supply that generates a RF signal with a DC offset voltage that establishes DC and RF electric fields in the volume 30' of the ion trap 33. Ions travel in the ion trap cylinder 30 under the influence of the DC and RF electric fields.

An ion detection system 34 includes an ion detector 36 that generates an ion current signal that is proportional to the ion flux ejected from the ion trap 33. Any type of ion detector can be used with the ion storage system 10 of the present invention. In the embodiment shown, the ion detector 36 is an electron multiplier, such as a microchannel plate, that produces an amplified electron current signal having a signal amplitude that is suitable for amplification and processing by commercially available electronic circuits. The electron multiplier is connected to a high voltage power supply 37, such as a high voltage switching power supply that generates approximately one thousand volts. The high voltage power supply 37 is typically positioned external to the vacuum chamber 12.

The ion detection system 34 detects and then counts the ejected ions and/or detects and measures the ion flux of the resulting ion beam. In one embodiment, the ion detection system 34 monitors the flux of ions in the ion trap cylinder 30 during the ionization period and determines parameters, such as the total ionization rate. The ion detection system 34 can also determine the total pressure present in the ion trap cylinder 30.

In one embodiment, the ion detection system 34 includes signal processing circuitry that conditions the signal generated by the ion detector 36. Many suitable signal processing circuits are known in the art and commercially available. For example, the ion detection system 34 can include a preamplifier 38 that amplifies the signal generated by the ion detector 36 to signal levels that can be processed by standard electronic circuits. The ion detection system 34 can include an integrator 40 that integrates the ion current signal over a predetermined time. The ion detection system 34 can also include an analog-to-digital converter 42 that converts the processed signal generated by the ion detector 36 to digital signals that can be stored and manipulated by a computer or other digital device.

Known ion storage systems typically extract ions while continuing to apply the RF field to an ion trap. Some known ion storage systems eject ions by applying a pulse to one end of the ion trap while maintaining the RF field on the ion trap. Other known ion storage systems eject ions sequentially by ramping the RF and/or DC voltage applied to the ion trap.

In one embodiment of the present invention, the RF field generated by the ion trap power supply 32 is abruptly terminated. Ejecting ions from the ion trap 33 by abruptly terminating the RF field is relatively simple and inexpensive to implement and, therefore, reduces the cost to manufacture the instrument. For example, the ion trap power supply 32 can include a switching device or other device that forces the power supply output into a short-circuit condition. There are numerous types of switching devices that can force the power supply into a short-circuit condition. For example, the switching device can be an electrical switch, such as a switching transistor, a mechanical switch, an electro-mechanical switch, such as a relay, or an electronic circuit that includes a switching transistor.

In one embodiment, the switching device can be transistors in the ion trap power supply 32. In one embodiment, the switching device forces the ion trap power supply 32 into a short-circuit condition at the end of the last desired RF cycle, thereby abruptly terminating the RF signal generated by the ion trap power supply 32. There are numerous other known methods of abruptly terminating the RF signal.

Abruptly terminating the RF signal generated by the ion trap power supply 32 ejects the ions in the ion trap 33 in a relatively short period of time compared with known methods. In one embodiment, the RF field generated by the ion trap power supply 32 is abruptly terminated within one period of the RF field. In other embodiments, the RF field generated by the ion trap power supply 32 is abruptly terminated within a fraction of one period of the RF field.

Terminating the RF signal within one period of the RF field results in ejection of a relatively high ion flux because all of the ions are ejected in a relatively short period of time. The relatively high ion flux results in a detected ion current signal that has a relatively high signal-to-noise ratio. Terminating the RF signal within one period of the RF field also results in a detected ion current signal that has a relatively high signal-to-noise ratio because the detected ion currents have relatively low noise since there is no electromagnetic interference caused by the ion trap power supply 32. Terminating the RF signal within one period of the RF field also results in highly reproducible ion ejection.

Known ion storage systems use high quality factor (Q) circuits to generate the high RF voltages required for trapping ions. High Q circuits are efficient, but have a relatively long natural RF decay after deactivation. The RF decay after deactivation is typically many cycles for a high Q circuit. An estimate for the number of cycles of the RF decay at deactivation is the numerical value for Q. For example, the RF decay of a circuit with a Q equal to one hundred is approximately one hundred cycles.

In one embodiment of the present invention, the ion trap power supply 32 is shorted with minimal ringing in order to clamp the voltage to a low value and to dissipate the energy stored in the high-Q circuit. One embodiment of such an ion trap power supply is described herein in connection with FIG. 3.

In one embodiment, electronic events associated with the ion storage system 10 are synchronized to a clock that controls electronic events associated with the ion storage system 10. The clock can be one master clock, or can be several clocks synchronized to each other or to a master clock. By clock we mean a circuit, such as an oscillator circuit, that generates a periodic synchronization or timing signal. By master clock we mean a clock circuit that generates a periodic synchronization or timing signal that is used to time or synchronize more than two devices or events.

In one embodiment, a processor, such as a microprocessor or embedded processor, having a clock that controls all electronic events in the ion storage system 10 is used.

In one embodiment, the onset and cut-off of the RF signal generated by the ion trap power supply 32 are synchronized together or are synchronized to other electronic events occurring within the ion storage system 10. The RF signal generated by the ion trap power supply 32 can be derived from a clock signal that synchronizes electronic events occurring within the ion storage system 10. Deriving the RF signal from a master clock is advantageous because the phase of the RF signal can be synchronized to the master clock and, therefore, the RF signal can be abruptly terminated in a reliable manner at a predetermined phase.

Synchronizing the onset and cut-off of the RF signal generated by the ion trap power supply 32 causes the RF field that confines the ions in the ion trap cylinder 30 to begin and end precisely in the same way for each sample to be ionized. Initiating and terminating the RF field at precise times allows for precise control over the duration and timing of the RF field and will result in more reproducible ion ejection.

In one embodiment, the ion detection system 34 is synchronized to electronic events occurring within the ion storage system 10. For example, in one embodiment, the operation of the valve 20 is synchronized to at least one of the analog-to-digital converter 42 and the ion trap power supply 32 by a common clock signal. In this embodiment, the data sampling is synchronized to the injection of the sample gas.

Synchronizing the valve 20 to electronic events occurring within the ion storage system 10 allows the user to inject sample gas into the volume 30' of the ion trap cylinder 30 at the appropriate or optimal time in the ion trap cycle. Injecting the sample gas into the ion trap cylinder 30 at the appropriate or optimal time allows the user to generate the desired pressure profile as a function of time during the ionization period. Injecting the sample gas into the ion trap cylinder 30 at the appropriate or optimal time can also increase sensitivity, reduce background noise and reduce pumping requirements.

In one embodiment, the ion trap power supply 32 and the analog-to-digital converter 42 are synchronized by a common clock signal. In this embodiment, the data sampling is synchronized to the termination of the RF field. Synchronizing the data sampling to the termination of the RF field reduces random noise in the detected ion current and, therefore, a more accurate ion current measurement can be performed. Forcing the data sampling to occur at precisely the same phase of the RF signal during successive measurements, however, causes the RF signal to appear as a DC offset to the data. The resulting DC offset can be subtracted from the signal by numerous known techniques.

In one embodiment, electrical power is terminated to electrical noise producing devices associated with the ion storage system 10 during ion current measurements. In this embodiment, the vacuum pump motor (not shown), filament power supply 24, ion trap power supply 32, and other electrical noise producing devices are synchronized to the analog-to-digital converter 42 with a common clock signal.

In operation, the electrical power to the vacuum pump 14, filament power supply 24, ion trap power supply 32, and other electrical noise producing devices is terminated simultaneously with, or just prior to, data collection. For example, in an embodiment where the ion trap cycle time is between 10 milliseconds (msec) and 100 msec, the time that electrical power is terminated to noise producing devices can be approximately between 0.1 msec and 10 msec. Terminating the power to noise producing devices during ion current measurements reduces electrical background noise and, therefore, increases the signal-to-noise ratio of the ion current signal.

One application of the ion storage system 10 is mass spectrometry. In particular, the ion storage system 10 is particularly useful for mass spectrometer-based leak detectors. Thus, one embodiment of the present invention is an ion storage system 10 for a mass spectrometer or for a mass spectrometer-based leak detector. Known mass spectrometer-based leak detectors use magnetic sectors or quadrupole mass filters. These filters continuously measure a relatively low-level flux of ions. The sensitivity of these known mass spectrometer-based leak detectors is limited by the signal-to-noise ratio of the ion current generated by the low-level ion flux.

A mass spectrometer-based leak detector including the ion storage system 10 is more accurate because the ion current generated by the ion detection system 34 has a significantly higher signal-to-noise ratio, as compared with known mass spectrometers. The signal-to-noise ratio is higher because the ion storage system 10 generates a significantly larger ion current due to ions being ejected in a relatively short period of time, as described herein. Also, the signal-to-noise ratio is higher because the detection of the ions is synchronized to the ejection of the ions, as described herein. In addition, the signal-to-noise ratio is higher because noise-producing components associated with the ion storage system 10 can be deactivated during ion current measurements, as described herein.

Figure 2:
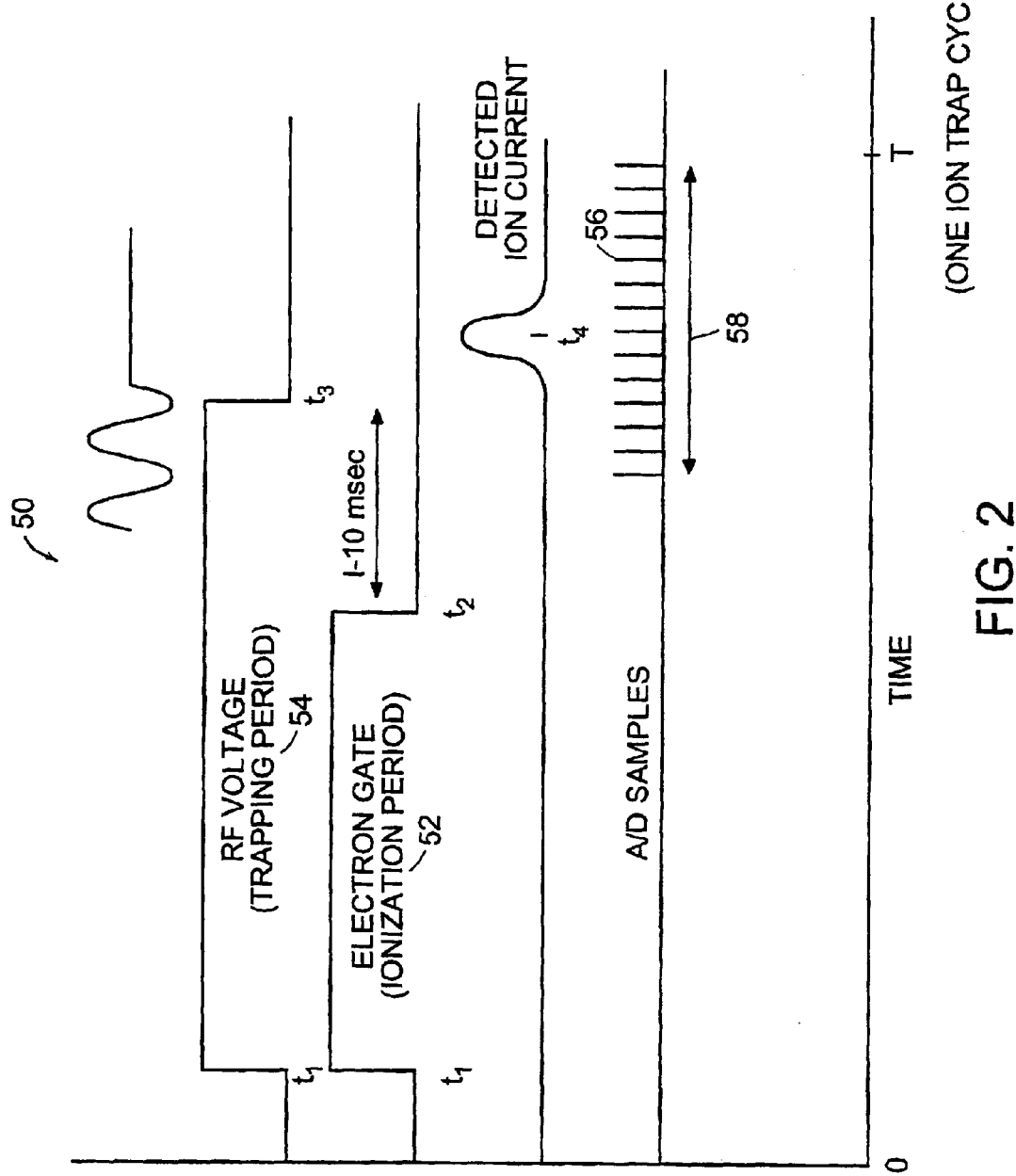
FIG. 2 is a timing diagram illustrating the operation of the ion storage system of the present invention.

FIG. 2 is a timing diagram 50 that illustrates the operation of the ion storage system 10. The gas induction system 16 introduces neutral gas molecules though the valve 20 into the vacuum chamber 12. The filament power supply 24 is energized causing power to be applied to the filament 22, which results in the thermionic emission of electrons. At time $t_1$, the gate voltage power supply 28 is energized causing a DC negative voltage to be applied to the filament 22 and simultaneously causing the gate electrode 26 to be biased positively with respect to ground, which initiates the ionization period 52. The resulting electric field generated by the gate electrode 26 causes the electrons generated by the filament 22 to be directed into the volume 30' of the ion trap cylinder 30. The electrons traveling in the volume 30' of the ion trap cylinder 30 ionize the neutral gas molecules or atoms that are introduced by the gas injection system 16 or by other means, such as through a vacuum system.

Also, at time $t_1$, the ion trap power supply 32 is activated, thereby applying DC and RF electric fields to the ion trap cylinder 30. Ions having charge-to-mass ratios within a particular range travel in orbital paths within the ion trap cylinder 30 under the influence of the electric fields. The range of charge-to-mass ratios is determined by the geometry of the ion trap cylinder 30 and the magnitude of the fields. Ions having charge-to-mass ratios outside the particular range will generally orbit out of the ion trap cylinder 30 or collide with the walls of the ion trap cylinder 30.

At time $t_2$, the gate electrode power supply DC voltage is terminated, thereby ending the ion ionization period 52. The ions, however, continue to be stored in the ion trap cylinder 30 by the DC and RF fields established by the ion trap power supply 32. At time $t_3$, the RF field generated by the ion trap power supply 32 is abruptly terminated, as described herein, thereby terminating the ion trap period 54. In other embodiments, at time $t_3$, the DC and RF fields generated by the ion trap power supply 32 are abruptly terminated. The ions being stored in the ion trap cylinder 30 are substantially simultaneously ejected out of the ion trap cylinder 30 at time $t_3$. In other embodiments, the ions are sequentially ejected out of the ion trap cylinder 30 according to their charge-to-mass ratio. The ejected ions are detected by the ion detection system 34. At time $t_4$, the ion current is measured.

The time between terminating the ion trapping period 54 and terminating the ionization period 52 depends upon many parameters including the pressure in the ion trap cylinder 30, the geometry of the ion trap cylinder 30, the magnitude of the electric fields, and the charge-to-mass ratio range of the ions to be stored and measured. This time can be calculated or can be experimentally determined. For example, the time between terminating the ion trapping period 54 and terminating the ionization period 52 can be on the order of 1–10 msec.

In one embodiment, the time $t_4$ at which the ion current is measured is synchronized to the time $t_3$ at which the RF field generated by the ion trap power supply 32 is abruptly terminated. In other embodiments, the time $t_4$ is synchronized to the time $t_3$ at which the both the DC and RF fields generated by the ion trap power supply 32 are abruptly terminated. In one embodiment, the analog-to-digital converter 42 samples the ion current data 56 during a sampling time interval 58, as described herein. The sampling time interval 58 is synchronized to the time $t_3$ at which the DC and RF fields generated by the ion trap power supply 32 are abruptly terminated.

Figure 3:
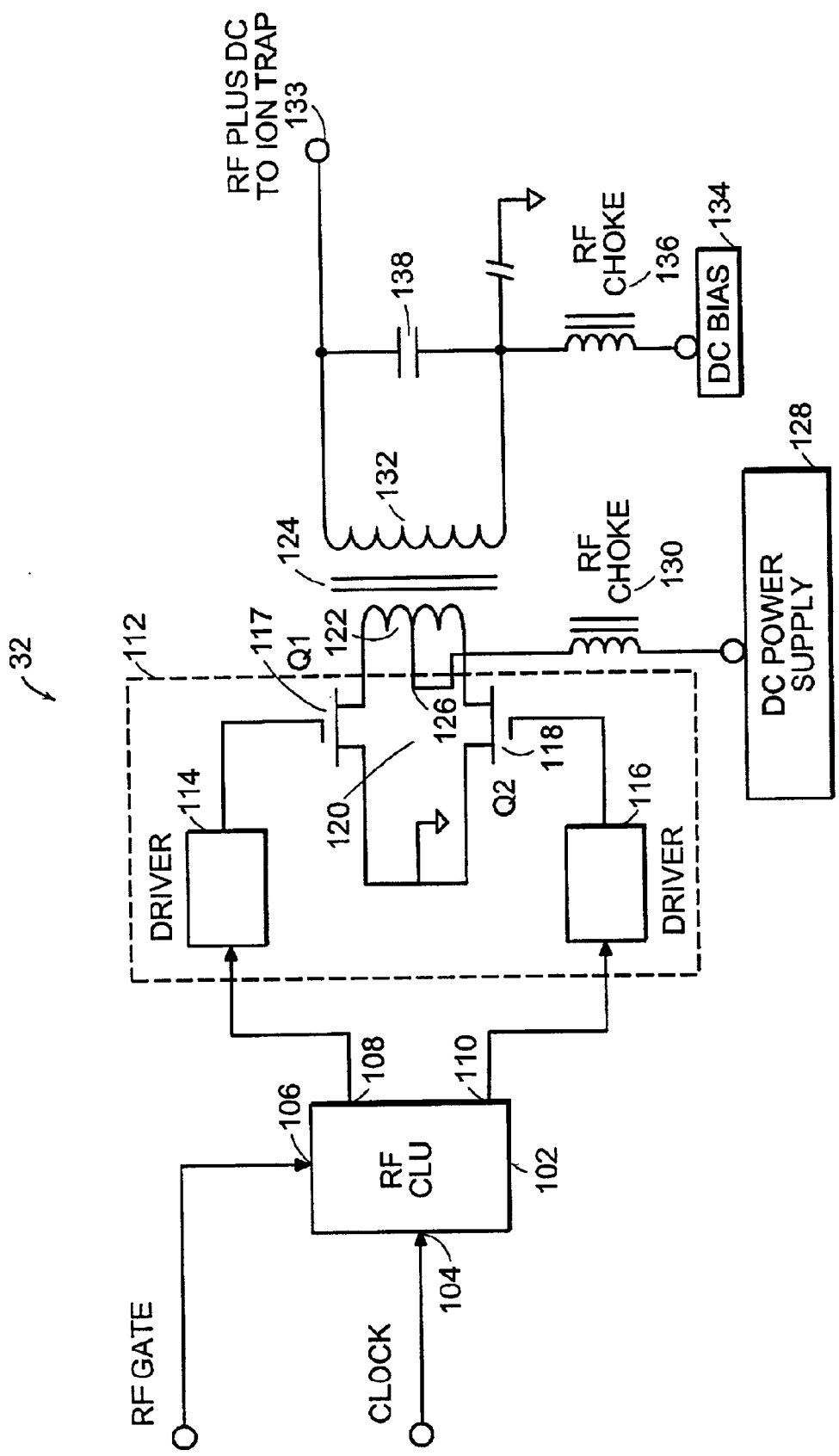
FIG. 3 illustrates a schematic diagram of an ion trap power supply according to the present invention that abruptly terminates a RF field to eject ions from the ion trap.

FIG. 3 illustrates a schematic diagram of one embodiment of the ion trap power supply 32 that abruptly terminates the RF field to eject ions from the ion trap cylinder 30. The ion trap power supply 32 is an inverter-type switching regulated power supply that generates a DC voltage and RF signal. Numerous other power supplies that generate a DC voltage and RF signal can be used with the ion storage system 10 of the present invention.

The ion trap power supply 32 includes a RF control logic unit 102 that controls the operation of the power supply 32. The RF control logic unit 102 includes a clock input 104 that receives a clock signal. In one embodiment, the clock signal has a frequency that is substantially equal to the frequency of the RF field generated by the ion trap power supply 32. In another embodiment, the clock signal has a frequency that is substantially equal to an integer multiple of the frequency of the RF field generated by the ion trap power supply 32.

The clock signal can be synchronized to other electrical events associated with the ion storage system 10, as described herein. For example, the clock signal can be synchronized to at least one of the ion current data sampling 56 and to the interruption of power to noise producing devices, such as the vacuum pump motor (not shown), filament power supply 24, ion trap power supply 32, and other electrical noise producing devices. The clock signal can be derived from a master clock.

The RF control logic unit 102 also includes a RF gate signal input 106 that receives a RF gate signal that causes a RF field to be applied to the ion trap cylinder 30. The RF gate signal can be generated from within the ion trap power supply 32, or alternatively, generated by a device (not shown) that is external to the ion trap power supply 32, such as a microprocessor. In one embodiment, the RF gate signal is generated by a timing unit, such as a timing unit in a microprocessor. The RF gate signal can be derived from a master clock. The RF gate signal can be a pulse having a duration that is substantially equal to the ion trap period 54.

In one embodiment, the RF control logic unit 102 includes a pulse width modulation circuit that generates pulse width modulated signals at a first 108 and a second output 110. The RF control logic unit 102 also includes a timing circuit that synchronizes the pulse width modulated signals generated at the first 108 and the second output 110 to the clock signal received at the clock input 104 and the RF gate signal received at the RF gate signal input 106. The timing circuit in the RF control logic unit 102 also determines the precise time to abruptly terminate the RF signal generated by the ion trap supply 32 to eject ions from the ion trap 33, as described herein.

The ion trap power supply 32 also includes a driven inverter 112 that includes a first 114 and a second transistor driver 116. The first 108 and the second output 110 of the RF control logic unit 102 is electrically coupled to an input of the first 114 and the second transistor driver 116, respectively. The inverter 112 also includes a first 117 and a second switching transistor 118 that are connected in a push-pull transistor pair 120. Any type of switching transistor can be used. The outputs of the first 114 and the second transistor driver 116 are electrically coupled to the gate or base of the first 117 and the second switching transistor 118, respectively. In other embodiments, more than two transistor drivers are used to drive more than two switching transistors.

The first 114 and the second transistor driver 116 receive the pulse width modulated signals generated by the RF control logic unit 102. In one embodiment, these pulse width modulated signals are synchronized to the clock signal and the RF gate control signal. The first 114 and the second transistor driver 116 then generate an output signal that controls the state of the first 117 and the second switching transistor 118 in the driven inverter 112.

One end of the transistor pair 120 is at ground potential and the other end is coupled to a primary winding 122 of a non-saturating transformer 124. A center tap 126 of the primary winding 122 of the transformer 124 is coupled to a DC power supply 128. In one embodiment, the center tap 126 of the primary winding 122 is coupled to the DC power supply 128 by a RF bias choke 130. The DC power supply 128 controls the amplitude of the RF signal. The DC power supply 128 establishes a potential across the transistor pair 120, which controls amplitude of the RF signal generated by the ion trap power supply 32 at the output 133.

The DC power supply 128 can include a RF level control circuit that is automatically controlled or that is controlled by the user. The RF level control circuit can adjust the DC power supply 128 so as to maintain a constant or programmed level of RF voltage at the ion trap power supply output 133.

A secondary winding 132 of the transformer 124 is coupled to a DC bias power supply 134. The DC bias power supply 134 is coupled to the secondary winding 132 by a RF choke 136 that has high impedance. A capacitor 138 is electrically connected in parallel with the secondary winding 132 of the transformer 124. The amplitude of the DC bias voltage generated by the DC bias power supply 134 controls the amplitude of the DC voltage generated by the ion trap power supply 32. Numerous other known inverter configurations can be used with the ion trap power supply 32. For example, a bridge inverter circuit can be used.

In operation, the RF control logic unit 102 receives the clock and RF gate signal. The RF control logic unit 102 then generates a pulse width modulation signal that instructs the first 114 and the second transistor driver 116 to alternatively bias the first 117 and the second switching transistor 118 into conduction (on) and non-conduction (off) states. The ion trap power supply 32 then generates a DC voltage and RF signal that traps ions having a particular charge-to-mass ratio range.

At a predetermined time after the gate voltage power supply 28 (FIG. 1) terminates the DC voltage applied to the gate electrode 26 (FIG. 1), the RF control logic unit 102 instructs the pulse width modulation circuit to generate a signal that causes the first 114 and the second transistor driver 116 to bias both the first 117 and the second switching transistor 118 simultaneously into conduction (on state). This results in sudden termination of the RF signal at a phase determined by the RF control logic unit 102. This can be accomplished with minimal or substantially no ringing.

In one embodiment, the ion trap power supply 32 is relatively compact and is highly efficient. In addition, the driven inverter 112 operates at a relatively constant switching rate and, therefore, minimizes harmonic generation and electrical noise.

Numerous other ion trap power supplies can be used in the ion storage system 10 of the present invention. Any type of power supply that generates a DC voltage and RF signal and that can terminate the RF signal at a precise time without significant ringing can be used. Also, the ion trap power supply can include separate DC and RF power supplies.

Figure 4:
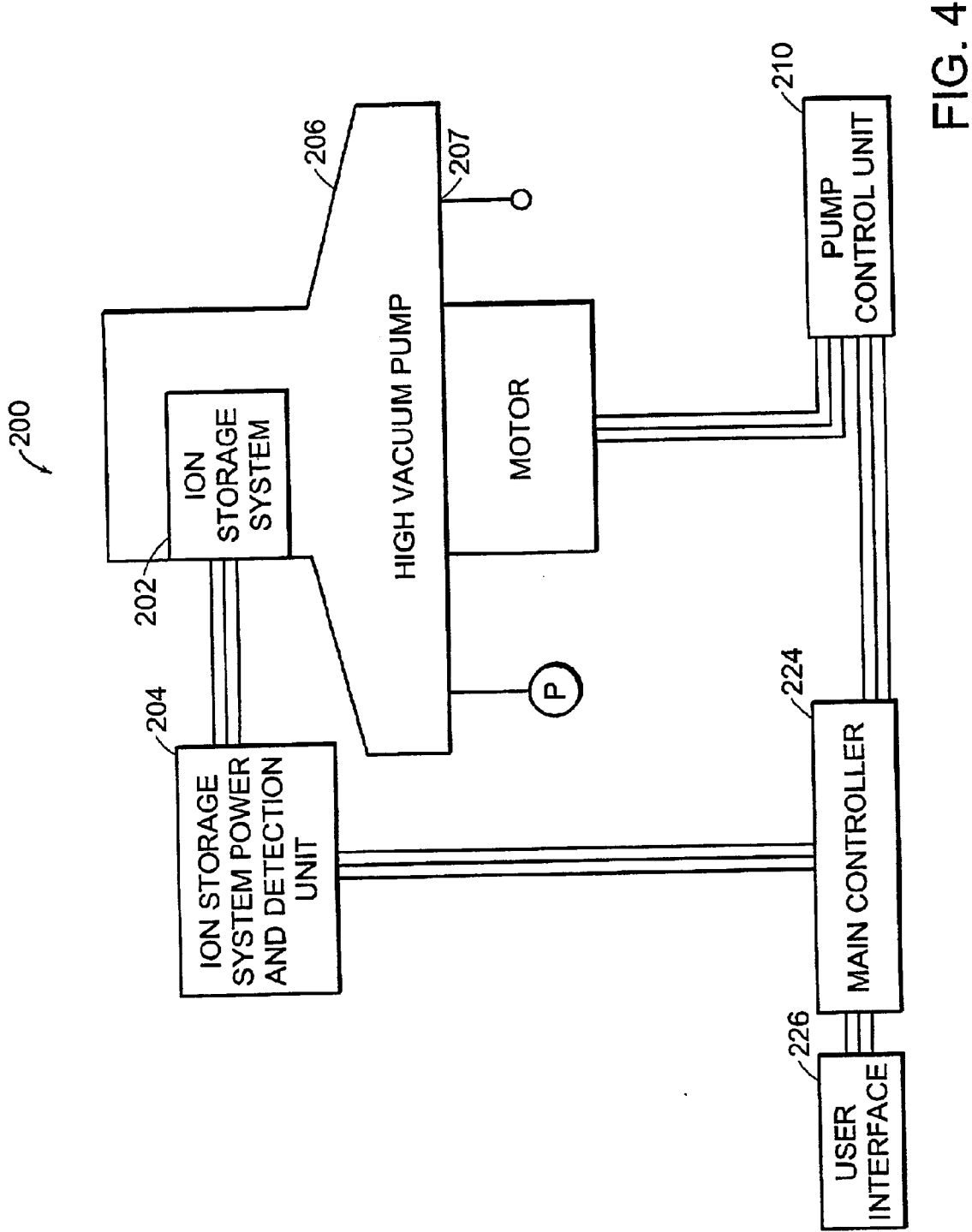
FIG. 4 illustrates a schematic diagram of one embodiment of a leak detector that includes the ion storage system of the present invention.

FIG. 4 illustrates a schematic diagram of one embodiment of a leak detector 200 that includes an ion storage system 202 of the present invention. In one embodiment, the ion storage system 202 is similar to the ion storage system 10 that is described in connection with FIG. 1. However, the ion storage system 202 is used to confine ions of a low molecular weight tracer gas, such as Helium. In this embodiment, the ion storage system 202 does not include the gas induction system 16. Instead, the sample gas is introduced through the vacuum system of the leak detector 200.

The leak detector 200 includes an ion storage system power and detection unit 204 that includes the power supplies and detection electronics that are described in connection with FIG. 1, such as the gate voltage power supply 28, the ion trap power supply 32, the high voltage power supply 37, and the ion detection system 34. The leak detector 200 also includes a high vacuum pump 206 that substantially evacuates the vacuum chamber (not shown) of the ion storage system 202. In one embodiment, the high vacuum pump 206 includes a gas inlet 207 that is positioned on the high pressure side of the high vacuum pump 206.

In another embodiment, the high vacuum pump 206 includes a gas inlet 207 that introduces sample gas directly into the ion trap 33 as described in connection with the ion storage system 10 of FIG. 1. In yet another embodiment, a forepump (not shown) is in fluid communication with the high vacuum pump 206 and the sample gas is introduced into the forepump.

In one embodiment, the high vacuum pump 206 has different compression ratios for gas molecules with different masses. For example, in one embodiment, the high vacuum pump 206 is a turbomolecular pump. In another embodiment, the high vacuum pump 206 is a molecular drag pump.

In operation a device (not shown) to be leak tested (DUT) is in fluid communication with the gas inlet 207. The DUT is evacuated by a forepump (not shown) to a pressure that is substantially less than atmospheric pressure. A source of tracer gas of low atomic weight, such as Helium, is provided proximate to the DUT. In the presence of a leak in the DUT, the tracer gas diffuses through the leak and into the gas inlet 207 on the high pressure side of the high vacuum pump 206. The tracer gas will diffuse through the high pressure side of the high vacuum pump 206 to the ion trap 33 (FIG. 1). The tracer gas is then ionized, stored, and detected in the ion trap 33. The leak detector 200 indicates the presence of a leak by an increase in a signal from the ion detection system 34 (FIG. 1) due to detection of ions of the tracer gas.

In one embodiment, the leak detector is used as a "sniffer." The DUT is filled with the tracer gas to a pressure that is greater than atmospheric pressure. A sampling system (not shown), which can include a vacuum pump, vacuum lines, and flow restrictors, samples the atmosphere proximate to the DUT and delivers the sample gas to the gas inlet 207 on the high pressure side of the high vacuum pump 206. The sampling system reduces the pressure of the sample gas (originally at atmospheric pressure) to an appropriate pressure. The tracer gas diffuses through the leak to atmosphere, where it is sampled by the sampling system and delivered to the gas inlet 207.

In one embodiment, the leak detector 200 also includes a pump control unit 210 that is electrically connected to the high vacuum pump 206. The pump control unit 210 controls the operation of the high vacuum pump 206. In one embodiment, the leak detector 200 also includes a main controller 224. The main controller 224 controls the operation of the ion storage system power and detection unit 204 and the pump control unit 210. A user interface 226 can be used to program and control the main controller 224. In one embodiment, the user interface 226 can be used to adjust the ion storage system power and detection unit 204 to trap ions of several gases on each of several ion trap cycles.

Equivalents

While the invention has been particularly shown and described with reference to specific preferred embodiments, it should be understood by those skilled in the art that various changes in form and detail can be made therein without departing from the spirit and scope of the invention as described herein. For example, the ion storage system can be used with any device or instrument that traps ions and is not limited to mass spectrometers or leak detectors.

What is claimed is:

1. An ion storage system comprising:
   a) an ion trap that defines a volume for storing a plurality of ions;
   b) a radio frequency (RF) generator that is electromagnetically coupled to the volume defined by the ion trap, the RF generator generating RF electrical field that stores the plurality of ions in the ion trap;
   c) a switching device that terminates the RF electrical field, the termination of the RF electrical field ejecting the plurality of ions from the ion trap for detection; and
   d) an ion detector that is substantially synchronized to the switching device, the ion detector detecting at least a portion of the plurality of ions that are ejected from the ion trap.

2. The ion storage system of claim 1 further comprising an ion source that generates the plurality of ions.

3. The ion storage system of claim 1 further comprising an ion source that provides the plurality of ions to the ion trap.

4. The ion storage system of claim 2 wherein the ion source generates the plurality of ions in the volume defined by the ion trap.

5. The ion storage system of claim 2 wherein the ion source comprises an electron source.

6. The ion storage system of claim 5 wherein the electron source comprises a thermionic emission filament.

7. The ion storage system of claim 2 wherein the ion detector is synchronized to the generation of the ions by the ion source.

8. The ion storage system of claim 2 further comprising a pulsed gas injector that provides neutral gas molecules.

9. The ion storage system of claim 2 further comprising a pulsed gas injector that provides neutral gas atoms to the ion source.

10. The ion storage system of claim 8 wherein the pulsed gas injector provides analyte gas molecules or atoms for mass analysis.

11. The ion storage system of claim 1 wherein the ion trap comprises a substantially cylindrically shaped volume.

12. The ion storage system of claim 1 wherein the ion trap comprises a volume having substantially straight walls.

13. The ion storage system of claim 1 wherein the ion trap comprises a volume having substantially curved walls.

14. The ion storage system of claim 13 wherein the curved walls comprise substantially hyperbolic shaped walls.

15. The ion storage system of claim 1 wherein the switching device comprises an electronic switching device.

16. The ion storage system of claim 1 wherein the switching device comprises a mechanical switching device.

17. The ion storage system of claim 1 wherein the switching device causes a short circuit condition that terminates the RF electrical field.

18. The ion storage system of claim 1 wherein the switching device terminates the RF electrical field within a time period that is substantially equal to or less than one cycle of the RF electrical field.

19. The ion storage system of claim 1 wherein the switching device is substantially synchronized with a predetermined phase of the RF electrical field.

20. The ion storage system of claim 1 wherein the ion detector is substantially synchronized with a predetermined phase of the RF electrical field.

21. The ion storage system of claim 1 wherein the ion detector is substantially synchronized to interrupting an operation of a vacuum pump that evacuates the volume defined by the ion trap.

22. The ion storage system of claim 1 further comprising a clock that synchronizes the switching device.

23. The ion storage system of claim 22 wherein the clock synchronizes the switching device to the ion detector.

24. The ion storage system of claim 22 wherein the clock determines a time at which the switching device terminates the RF electrical field.

25. The ion storage system of claim 1 wherein the ion detector comprises an electron multiplier.

26. An ion storage system comprising:
 a) an ion source that generates a plurality of ions;
 b) an ion trap that defines a volume for storing the plurality of ions;
 c) a radio frequency (RF) generator that is electromagnetically coupled to the volume defined by the ion trap, the RF generator generating a RF electrical field that stores the plurality of ions in the ion trap;
 d) a switching device that terminates the RF electrical field, the termination of the RF electrical field ejecting the plurality of ions from the ion trap for detection;
 e) an ion detector that detects at least a portion of the plurality of ions that are ejected from the ion trap; and
 f) a clock that is electrically connected to at least two of the ion source, RF generator, the switching device, and the ion detector, the clock substantially synchronizing the at least two of the ion source, the RF generator, the switching device, and the ion detector.

27. The ion storage system of claim 26 wherein the ion source generates the plurality of ions in the ion trap.

28. The ion storage system of claim 26 wherein the ion source comprises an electron source and a pulsed gas source.

29. The ion storage system of claim 26 wherein the ion trap comprises a substantially cylindrically shaped volume.

30. The ion storage system of claim 26 wherein the ion trap comprises a volume having substantially straight walls.

31. The ion storage system of claim 26 wherein the ion trap comprises a volume having substantially hyperbolic walls.

32. The ion storage system of claim 26 wherein the switching device comprises an electronic switching device.

33. The ion storage system of claim 26 wherein the switching device causes a short circuit condition that terminates the RF electrical field.

34. The ion storage system of claim 26 wherein the switching device terminates the RF electrical field within a time period that is substantially equal to or less than one cycle of the RF electrical field.

35. The ion storage system of claim 26 wherein the ion detector comprises an electron multiplier.

36. The ion storage system of claim 26 wherein the ion detector is substantially synchronized to interrupting an operation of a vacuum pump that evacuates the volume defined by the ion trap.

37. An ion storage system comprising:
 a) means for generating a plurality of ions from neutral gas molecules or atoms;
 b) means for establishing a radio frequency (RF) electrical field proximate to the plurality of ions, thereby trapping the plurality of ions in a volume;
 c) means for terminating the RF electrical field, thereby ejecting the plurality of ions from the volume for detection; and
 d) means for detecting at least a portion of the plurality of ions ejected from the volume at a predetermined time after terminating the RF electrical field.

38. The ion storage system of claim 37 wherein the means for terminating the RF electrical field is substantially synchronized to at least one of the means for generating the plurality of ions, means for establishing the RF electrical field, and means for detecting the at least a portion of the plurality of ions ejected.

39. A method for detecting ions, the method comprising:
 a) establishing a radio frequency (RF) electrical field proximate to a plurality of ions, thereby trapping the plurality of ions in a volume;
 b) terminating the RF electrical field, thereby ejecting the plurality of ions from the volume for detection; and
 c) detecting at least a portion of the plurality of ions ejected from the volume at a predetermined time after terminating the RF electrical field.

40. The method of claim 39 further comprising generating ions from neutral gas molecules or atoms.

41. The method of claim 39 wherein a time at which the RF electrical field is terminated is substantially synchronized to at least one of a predetermined phase of the RF electrical field and a time of detecting at least a portion of the plurality of ions ejected from the volume.

42. The method of claim 39 wherein the terminating the RF electrical field is completed substantially within one cycle of the RF electrical field.

43. The method of claim 39 wherein the detecting at least the portion of the plurality of ions ejected from the volume occurs at a predetermined time after terminating the RF electrical field.

44. The method of claim 39 wherein the detecting the at least a portion of the ions ejected from the ion trap occurs at a predetermined time after terminating the RF electrical field that maximizes a signal-to-noise ratio of an electrical signal related to the detection of the at least a portion of the plurality of ions.

45. The method of claim 39 wherein the terminating the RF electrical field comprises establishing a short-circuit condition that terminates the RF electrical field.

46. A leak detector comprising:
   a) an ion source that receives a tracer gas and that generates a plurality of ions of the tracer gas;
   b) an ion trap that defines a volume for storing the plurality of ions of tracer gas;
   c) a radio frequency (RF) generator that is electromagnetically coupled to the volume defined by the ion trap, the RF generator generating a RF electrical field that stores the plurality of ions of the tracer gas in the ion trap;
   d) a switching device that terminates the RF electrical field, the termination of the RF electrical field ejecting the plurality of ions from the ion trap for detection;
   e) an ion detector that detects at least a portion of the plurality of ions that are ejected from the ion trap; and
   f) a clock that is electrically connected to at least two of the ion source, RF generator, the switching device, and the ion detector, the clock substantially synchronizing the at least two of the ion source, the RF generator, the switching device, and the ion detector.

* * * * *